United States Patent [19]

Turner

[11] 4,396,252
[45] Aug. 2, 1983

[54] PROXIMITY COUPLED ELECTRO-OPTIC DEVICES

[75] Inventor: William D. Turner, San Marino, Calif.

[73] Assignee: Xerox Corporation, Stamford, Conn.

[21] Appl. No.: 187,936

[22] Filed: Sep. 17, 1980

[51] Int. Cl.³ .............................................. G02F 1/01
[52] U.S. Cl. .................................... 350/355; 350/356
[58] Field of Search ................. 350/355, 356; 358/296

[56] References Cited

U.S. PATENT DOCUMENTS 4,281,904  8/1981  Sprague et al. ...................... 350/355

Primary Examiner—William L. Sikes
Assistant Examiner—Leon Scott, Jr.

[57] ABSTRACT

One or more electrodes of an electro-optic device are supported on a separate substrate which is held in close contact with the electro-optic element of the device so that the electric fields that are created when voltages are applied to such electrodes are proximity coupled into the electro-optic element. Proximity coupling is especially advantageous for multi-gate light valves and the like where separate electrical connections have to be made to a multitude of electrodes because it permits those connections to be made remotely from the electro-optic element. However, the broader aspects of proximity coupling are applicable to electro-optic devices in general, including bulk and TIR electro-optic modulators and straight through and TIR multi-gate electro-optic light valves.

11 Claims, 8 Drawing Figures

PROXIMITY COUPLED ELECTRO-OPTIC DEVICES

BACKGROUND OF THE INVENTION

This invention relates to electro-optic devices and, more particularly, to proximity coupled light valves for electro-optic line printers and the like.

It has been shown that an electro-optic element having a plurality of individually addressable electrodes can be used as a multi-gate light valve for line printing. See, for example, a copending and commonly assigned U.S. patent application of R. A. Sprague et al., which was filed June 21, 1979 under Ser. No. 040,607 on a "TIR Electro-Optic Modulator with Individually Addressed Electrodes." Also see "Light Gates Give Data Recorder Improved Hardcopy Resolution," *Electronic Design*, July 19, 1979, pp. 31–32; "Polarizing Filters Plot Analog Waveforms," *Machine Design*, Vol. 51, No. 17, July 26, 1979, p. 62; and "Data Recorder Eliminates Problem of Linearity," *Design News*, Feb. 4, 1980, pp. 56–57.

Almost any optically transparent electro-optical material can be used as the electro-optic element of such a light valve. As of now the most promising materials appear to be $LiNbO_3$ and $LiTaO_3$, but there are other materials which qualify for consideration, including BSN, KDP, $KD^xP$, $Ba_2NaNb_5O_{15}$ and PLZT. In any event, the electrodes of such a light valve are intimately coupled to the electro-optic element and are distributed in non-overlapping relationship widthwise of the electro-optic element (i.e., orthogonally relative to its optical axis), typically on equidistantly separated centers so that there is a generally uniform interelectrode gap spacing.

To perform line printing with a multi-gate light valve of the foregoing type, a photosensitive recording medium, such as a xerographic photoreceptor, is exposed in an image configuration as it advances in a cross line direction (i.e., a line pitch direction) relative to the light valve. More particularly, to carry out the exposure process, a sheet-like collimated light beam is transmitted through the electro-optic element of the light valve, either along its optical axis for straight through transmission or at a slight angle relative to that axis for total internal reflection. Furthermore, successive sets of digital bits or analog signal samples (hereinafter collectively referred to as "data samples"), which represent respective collections of picture elements or pixels for successive lines of the image, are sequentially applied to the electrodes. As a result, localized electric bulk or fringe fields are created within the electro-optic element in the immediate vicinity of any electrodes to which non-reference level data samples are applied. These fields, in turn, cause localized variations in the refractive index of the electro-optic element within an interaction region (i.e., a light beam illuminated region of the electro-optic element which is subject to being penetrated by the electric fields). Thus, the phase front or polarization of the light beam is modulated (hereinafter generically referred to as "p-modulation" of the light beam) in accordance with the data samples applied to the electrodes as the light beam passes through the interaction region. Schlieren readout optics may be used to convert a phase front modulated light beam into a light beam having a correspondingly modulated intensity profile. For example, the phase front modulated light beam may be imaged onto the recording medium by central dark field or central bright field imaging optics. Alternatively, if the input light beam is polarized, a polarization modulation to intensity modulation conversion process may be performed by passing the polarization modulated output beam through a polarization analyzer. In more generic terms, the p-modulation of the light beam is converted into a corespondingly modulated intensity profile by using "p-sensitive readout optics" to image or project (hereinafter collectively referred to as imaging) the light beam onto the recording medium.

SUMMARY OF THE INVENTION

In accordance with this invention, one or more electrodes of an electro-optic device are supported on a separate substrate which is held in close contact with the electro-optic element of the device so that the electric fields that are created when voltages are applied to such electrodes are proximity coupled into the electro-optic element. Proximity coupling is especially advantageous for multi-gate light valves and the like where separate electrical connections have to be made to a multitude of electrodes because it permits such connections to be made remotely from the electro-optic element. However, the broader aspects of proximity coupling are applicable to electro-optic devices in general, including bulk and TIR electro-optic modulators and straight through and TIR multi-gate electro-optic light valves.

BRIEF DESCRIPTION OF THE DRAWINGS

Still other features and advantages of this invention will become apparent when the following detailed description is read in conjunction with the attached drawings, in which.

DETAILED DESCRIPTION OF THE ILLUSTRATED EMBODIMENTS

While the invention is described in some detail hereinbelow with reference to certain illustrated embodiments, it is to be understood that there is no intent to limit it to those embodiments. On the contrary, the aim is to cover all modifications, alternatives and equivalents falling within the spirit and scope of the invention as defined by the appended claims.

Figure 1:
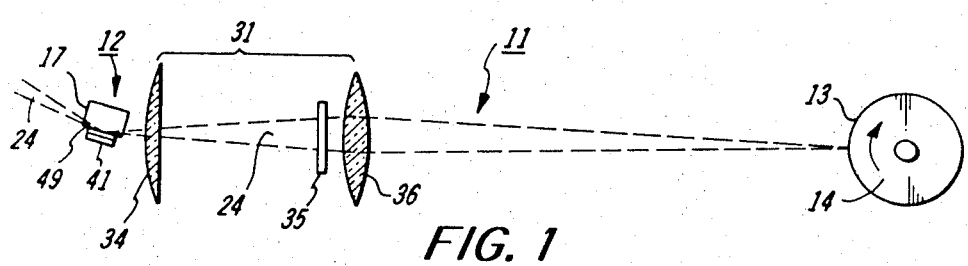
FIG. 1 is a schematic side view of an electro-optic line printer including a proximity coupled TIR multi-gate light valve which is constructed in accordance with the present invention.
Figure 2:
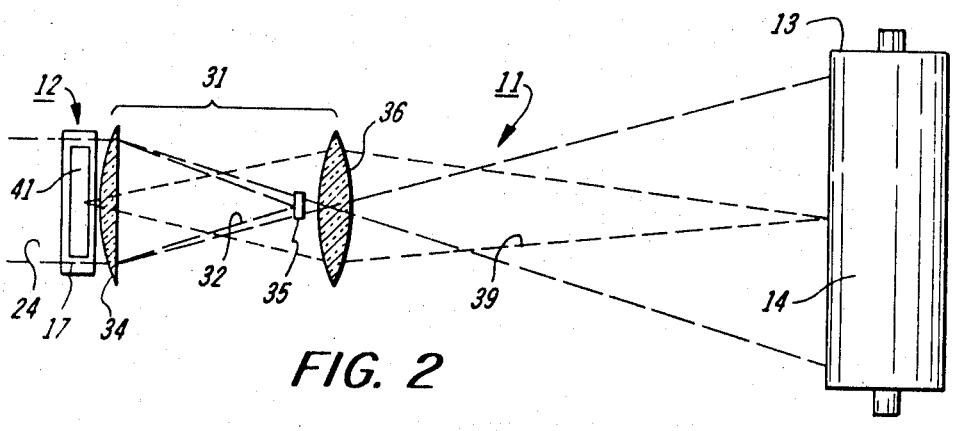
FIG. 2 is a schematic bottom plan view of the electro-optic line printer shown in FIG. 1.

Turning now to the drawings, and at this point especially to FIGS. 1 and 2, there is an electro-optic line printer 11 comprising a multi-gate light valve 12 for exposing a photosensitive recording medium 13 in an image configuration. The recording medium 13 is depicted as being a photoconductively coated xerographic drum 14 which is rotated (by means not shown) in the direction of the arrow. It nevertheless will be evident that there are other xerographic and non-xerographic recording media that could be used, including photoconductively coated xerographic belts and plates, as well as photosensitive film and coated paper in web or cut sheet stock form. The recording medium 13 should, therefore, be visualized in the generalized case as being a photosensitive medium which is exposed in an image configuration while advancing in a cross line or line pitch direction relative to the light valve 12.

Figure 3:
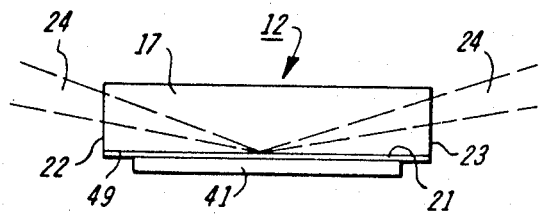
FIG. 3 is an enlarged side view of a TIR light valve for the electro-optic line printer of FIGS. 1 and 2.
Figure 4:
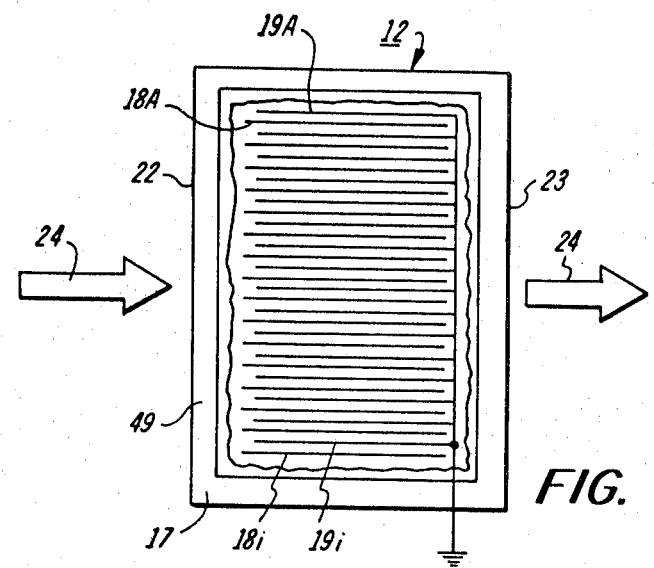
FIG. 4 is an enlarged cutaway bottom view of the TIR light valve of FIG. 3 showing an alternating pattern of individually addressable electrodes and ground plane electrodes, such as may be used if the data samples applied to the electrodes are referenced to ground.
Figure 5:
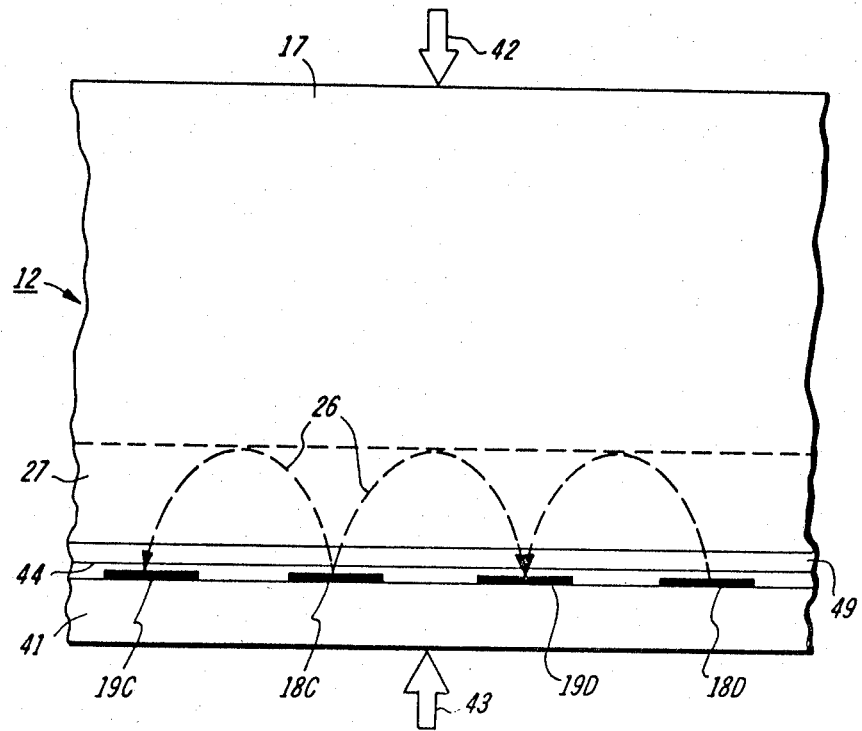
FIG. 5 is a further enlarged and fragmentary schematic end view of the TIR light valve shown in FIG. 3 to better illustrate the proximity coupling of the electrodes to the electro-optic element and the interaction which occurs within the electro-optic element between the light beam and the electric fringe fields.

As shown in FIGS. 3–5, the light valve 12 includes an electro-optic element 17, a plurality of individually addressable electrodes $18a$–$18i$, and a corresponding plurality of ground plane electrodes $19a$–$19i$. For a total internal reflection (TIR) mode of operation as illustrated, the electro-optic element 17 typically is a y cut crystal of, say, $LiNbO_3$ having an optically polished reflecting surface 21 which is integral with and disposed between optically polished input and output faces 22 and 23, respectively. The electrodes $18a$–$18i$ and $19a$–$19i$ are intimately coupled to the electro-optic element 17 adjacent the reflecting surface 21 and are distributed across essentially the full width of the electro-optic element 17 in alternating parallel paired relationship. Typically, the electrodes $18a$–$18i$ and $19a$–$19i$ are approximately 1–30 microns wide and are on centers which are more or less equidistantly separated to provide a generally uniform interelectrode gap spacing of 1–30 microns. In this particular embodiment the electrodes $18a$–$18i$ and $19a$–$19i$ extend generally parallel to the optical axis of the electro-optic element 17 and have projections of substantial length along that axis. Alternatively, the electrodes $18a$–$18i$ and $19a$–$19a$ could extend at the so-called Bragg angle relative to the optical axis of the electro-optic element 17 and still should have projections of substantial length along that axis. If the electrodes $18a$–$18i$ and $19a$–$19i$ are parallel to the optical axis of the electro-optic element 17, the light valve 12 will produce a diffraction pattern which is symmetrical about the zero order diffraction component. If, on the other hand, the electrodes $18a$–$18i$ and $19a$–$19i$ are at the Bragg angle relative to the optical axis of electro-optic element 17, the light valve 12 will produce an asymmetrical diffraction pattern.

Briefly reviewing the operation of the line printer 11 with reference to FIGS. 1–6, a sheet-like collimated beam of light 24 from a suitable source, such as a laser (not shown), is transmitted through the input face 22 of the electro-optic element 17 at a grazing angle of incidence relative to the reflecting surface 21. The light beam 24 is brought to a wedge shaped focus (by means not shown) at approximately the centerline of the surface 21 and is totally internally reflected therefrom for subsequent transmission through the output face 23. As will be seen, the light beam 24 illuminates substantially the full width of the electro-optic element 17 and is phase front modulated while passing therethrough in accordance with the data samples applied to the electrode pairs ($18a$, $19a$)–($18i$, $19i$).

More particularly, to modulate the light beam 24, successive sets of digital or analog data samples, which represent respective collections of picture elements for successive lines of the image, are sequentially applied to the electrode pairs ($18a$, $19a$)–($18i$, $19i$). Localized fringe fields 26 are, therefore, produced within an interaction region 27 of the electro-optic element 17 between each pair of electrodes ($18a$, $19a$)–($18i$, $19i$) to which non-reference level data samples are applied. This creates localized variations in the refractive index of the electro-optic element 17 widthwise of the interaction region 27, and such refractive index variations faithfully represent the data samples appearing across the paired electrodes ($18a$, $19a$)–($18i$, $19i$) at any given point in time. Consequently, the phase front of the light beam 24 is sequentially spatially modulated in accordance with the data samples for successive lines of the image as the light beam 24 passes through the interaction region 27 of the electro-optic element 17.

To expose the recording medium 13 in an image configuration, there suitably are Schlieren central dark field imaging optics 31 which are optically aligned between the electro-optic element 17 and the recording medium 13 for imaging the light beam 24 onto the recording medium 13. The imaging optics 31 convert the spatial phase front modulation of the light beam 24 into a correspondingly modulated intensity profile and provide any magnification that is required to obtain an image of a desired width. To accomplish that, the illustrated imaging optics 31 include a field lens 34 for focusing the zero order diffraction components 32 of the phase front modulated light beam 24 onto a central stop 35 and an imaging lens 36 for imaging the higher order diffraction components onto the recording medium 13, i.e., the image plane for the light valve 12. The field lens 34 is optically aligned between the electro-optic element 17 and the stop 35 so that substantially all of the zero order components 32 of the light beam 24 are blocked by the stop 35. The higher order diffraction components of the light beam 24 scatter around the stop 35 and are collected by the imaging lens 36 which, in turn, causes them to fall onto the light image plane defined by the recording medium 13. Of course, other p-sensitive readout optics could be used to convert the phase front or polarization modulated light beam provided by the electro-optic element 17 into a light beam having a correspondingly modulated intensity profile.

To summarize, as indicated in FIG. 2 by the broken lines 39, each pair of electrodes ($18a$, $19a$)–($18i$, $19i$) cooperates with the electro-optic element 17 and the p-sensitive readout optics 36 to effectively define a local modulator for creating a picture element at a unique, spatially predetermined position along each line of the image. Accordingly, the number of electrode pairs ($18a$, $19a$)–($18i$, $19i$) determines the number of picture elements that can be printed on each line of the image. By sequentially applying successive sets of data samples to these local modulators while the recording medium 13 is advancing in a cross line direction relative to the light valve 12, successive lines of the image are printed.

In accordance with the present invention, as best shown in FIG. 5, the electrodes $18a-18i$ and $19a-19i$ are supported on a separate substrate 41 and are proximity coupled to the electro-optic element 17. A bonding agent, such as the clamp schematically represented by the arrows 42 and 43, is engaged with the electro-optic element 17 and the electrode bearing substrate 41 to hold the electrodes $18a-18i$ and $19a-19i$ in close contact with the reflecting surface 23 of the electro-optic element 17. An adhesive or suction might be used as the bonding agent in place of or in combination with the clamp 42 and 43. Regardless of the bonding agent selected, a small gap 44 is likely to exist over an appreciable portion of the interface between the electrodes $18a-18i$ and $19a-19i$, on the one hand, and the reflecting surface 23, on the other, due to unavoidable imperfections in the flatness of those elements and the presence of any foreign matter, such as dust particles (not shown), which may be entrapped in the gap 44. The interelectrode gap spacing of the electrodes $18a-18i$ and $19a-19i$ must be sufficiently large relative to the maximum width of the gap 44 to ensure that the fringe fields 45 span the gap 44 and penetrate the electro-optic element 17 to interact with the light beam 24 as previously described.

If a significant portion of the overall surface area of the electrodes $18a-18i$ and $19a-19i$ is in direct contact with the reflecting surface 23 of the electro-optic element, the light beam 24 may experience an unacceptable level of spurious phase and amplitude modulation under quiescent conditions (i.e., in the absence of any voltage drops across the electrodes). To avoid such a result, a thin dielectric layer 49 of, say, $SiO_2$, may be overcoated either on the reflecting surface 23, as shown, or on the electrodes $18a-18i$ and $19a-19i$ (not shown) to isolate the electrodes $18a-18i$ and $19a-19i$ from the reflecting surface 23. The dielectric layer 49 is selected to have an index of refraction which is less than the quiesecent index of refraction of the electro-optic element 17, and the thickness of the dielectric layer 49 is controlled so that it is substantially less than the interelectrode gap spacing (e.g., a $SiO_2$ layer 49 having a thickness on the order of 1000 angstroms will provide ample isolation to avoid electrode induced spurious modulation of the light beam 24). Thus, the fringe fields produced by the electrodes $18a-18i$ and $19a-19i$ may be coupled into the electro-optic element 17 via the dielectric layer 49 without suffering an unacceptable degree of attenuation.

Figure 6:
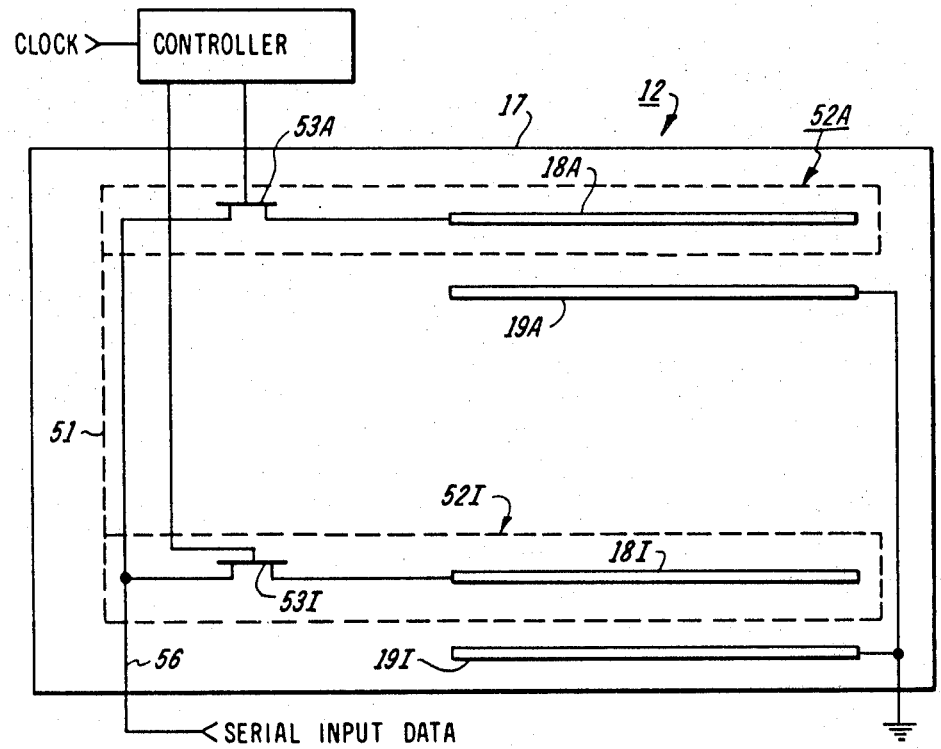
FIG. 6 is a simplified block diagram of a system for applying a ground plane referenced signal input data stream to the individually addressable electrodes of the electrode pattern shown in FIG. 3.

Turning now to FIG. 6, the electrode pattern shown in FIG. 4 is capable of accepting input data samples which are referenced to a common reference potential, which is assumed herein to be ground. Such data samples are typically supplied as a serial data stream at a predetermined data rate. For that reason, the line printer 11 has a multiplexer 51 for sequentially and cyclically applying successive input data samples to the individually addressable electrodes $18a-18i$ at a ripple rate which equals the data rate. The input data may, of course, be buffered (by means not shown) to permit the input data rate to be matched to a desired ripple rate. Additionally, the input data may be processed (by means also not shown) upstream of the multiplexer 41 for text editing, formatting or other purposes, provided that the data samples for the ultimate image are applied to the multiplexer 41 in adjacent picture element sequence. See, for example, a commonly assigned U.S. patent application of William Gunning et al., which was filed Apr. 5, 1978 under Ser. No. 893,658.

As described in more detail in a copending and commonly assigned U.S. patent application of Robert A. Sprague, on an "Electro-Optic Line Printer", there preferably are sample and hold circuits $52a-52i$ for maintaining the data samples for each line of the image on the electrode pairs $(18a, 19a)-(18i, 19i)$ for essentially a full line printing time (i.e., the time alloted to printing a given line of the image). To that end, the multiplexer 51 includes normally disabled series sampling gates $53a-53i$ and a controller 55. The sampling gates $53a-53i$ are coupled in series between a data input bus 56 and the individually addressable electrodes $18a-18i$ and are sequentially and cyclically enabled in response to control signals from the controller 55 to apply successive input data samples to adjacent ones of the electrode pairs $(18a, 19a)-(18i, 19i)$. It has been found that the capacitance provided by each of the individually addressable electrodes $18a-18i$ and the electro-optic element 17 is on the order of 1 picofarad and is sufficient to maintain a substantially constant voltage across each of the electrode pairs $(18a, 19a)-(18i, 19i)$ for a full line printing time. Thus, no other storage elements are needed to perform the sample and hold function.

Returning for a moment to FIG. 5, the electrode supporting substrate 41 is advantageously an electrical circuit, such as a silicon integrated circuit. In that event, as more completely described in a copending and commonly assigned application of Robert A. Sprague et al., on "Integrated Electronics for Proximity Coupled Electro-Optic Devices", the series sampling gates $53a-53i$ may be FET pass transistors which are integrated on the integrated circuit, and the electrodes $18a-18i$ and $19a-19i$ may be formed by suitably etching the outermost metalization layer or polysilicon conductive film layer used to define such pass transistors $53a-53i$.

Figure 7:
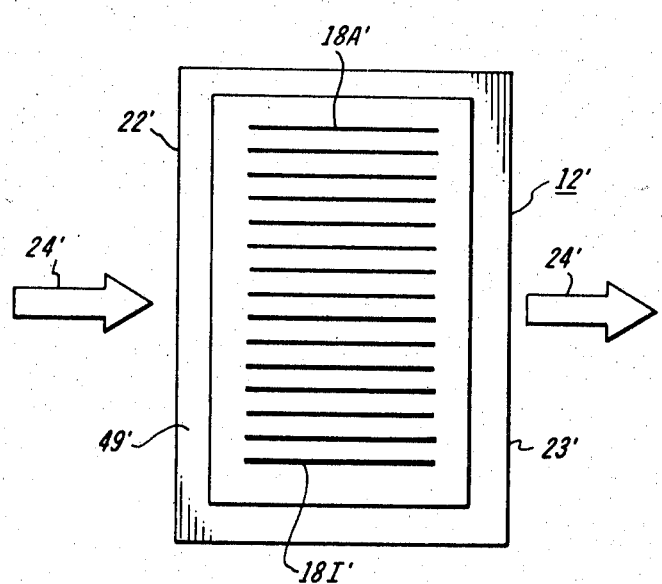
FIG. 7 is an enlarged cutaway bottom view of a TIR light valve having a pattern of immediately adjacent individually addressable electrodes which may be used if the data applied to the electrodes is differentially encoded.
Figure 8:
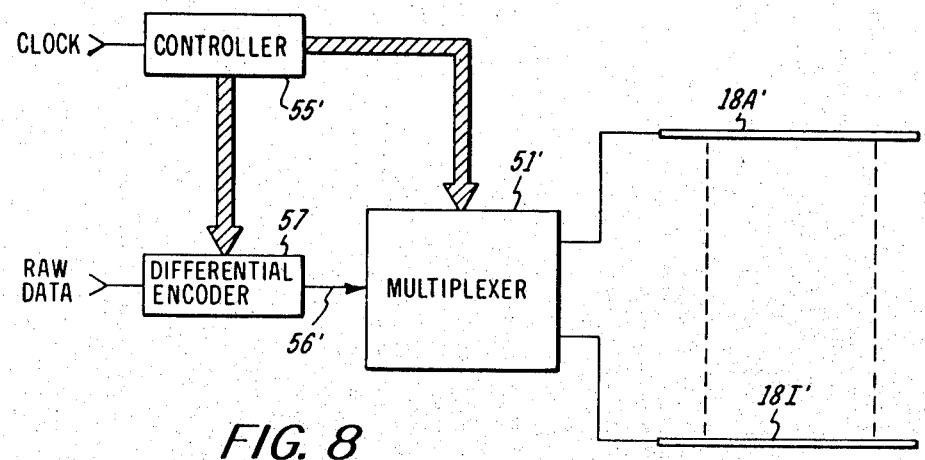
FIG. 8 is a simplified block diagram of a system for applying differentially encoded data to the electrode pattern of the TIR light valve shown in FIG. 7.

Referring to FIG. 7, it is shown in a copending and commonly assigned U.S. patent application of William D. Turner et al., on "Differential Encoding for Fringe Field Responsive Electro-Optic Line Printers", that differential encoding of the input data samples eliminates the need for the ground plane electrodes $19a-19i$ (FIG. 4). Each differentially encoded data sample, with the positive exception of the first sample for each line of the image, has a magnitude whose difference from the previous differentially encoded data sample corresponds to the magnitude of a respective input data sample. If the differential encoding is performed on a line-by-line basis, the first sample for each line of the image is referenced to a common reference potential, such as ground. It, therefore, follows that all picture elements are faithfully represented by the electrode to electrode voltage drops that are produced in response to the differentially encoded data. Hence, the fringe fields responsible for modulating the light beam $24^1$ in accordance with the input data samples for successive lines of an image are generated by sequentially applying the differentially encoded counterparts of the input data samples for the successive lines of the image to immediately adjust individually addressable electrodes $18a^1-18i^1$. As shown in FIG. 8, there suitably is a differential encoder 57 connected in front of the of the multiplexer $51^1$ so that differentially encoded data samples are rippled onto the electrodes $18a^1-18i^1$ in the same manner as previously described with reference to the application of the raw input data samples to the individually addressable electrodes of the embodiment illustrated in FIGS. 1-5. Differential encoding reduces the number of electrodes required to achieve a given resolution by a factor of just less than two, but it does not otherwise add to or detract from the proximity coupling of this invention. Hence, there is no need to specifically describe proximity coupling as applied to the embodiment of FIGS. 7 and 8.

CONCLUSION

In view of the foregoing, it will be understood that the proximity coupling techniques provided by the present invention are especially useful for electro-optic devices, such as multi-gate light valves of electro-optic line printers, which are characterized by having a multitude of electrodes to which separate electrical connections must be made. The electrical connections to the electrodes of a proximity coupled electro-optic device may be made remotely from the electro-optic element, thereby avoiding a potentially critical space constraint. However, it will also be appreciated that the broader aspects of proximity coupling are applicable to electro-optic devices in general because proximity coupling is a viable alternative to depositing the electrodes directly on the electro-optic element of such a device.

What is claimed is:

1. In an electro-optic device including
   an electro-optic element,
   a plurality of electrodes proximate said electro-optic element, and
   means coupled to said electrodes for applying voltages thereto, whereby electric fields are coupled into said electro-optic element;
   the improvement comprising:
   a substrate for supporting at least one of said electrodes, and
   means engaged with said electro-optic element and with said substrate for maintaining said substrate supported electrodes within a small gap distance of said electro-optic element, thereby proximity coupling said substrate supported electrodes to said electro-optic element.

2. The improvement of claim 1 wherein
   all of said electrodes are supported on said substrate, and said electrodes are spaced apart from one another by at least a minimum interelectrode gap spacing to create electric fringe fields in response to said voltages;
   said minimum interelectrode gap spacing is sufficiently large relative to said gap distance to cause said fringe fields to penetrate into said electro-optic element; and
   said means for applying said voltages to said electrodes is coupled to said electrodes remotely from said electro-optic element.

3. The improvement of claim 2 wherein
   said electro-optic element is optically transmissive and has a predetermined optical axis and a reflective surface which is generally parallel to said optical axis,
   said electro-optic device further includes means for applying a sheet-like, collimated light beam to said electro-optic element at a grazing angle of incidence relative to said reflective surface, whereby said light beam is totally internally reflected from said reflective surface, and
   said electrodes are proximity coupled to said electro-optic element adjacent said reflective surface and have projections of substantial length along said optical axis, whereby said light beam interacts with said fringe fields as it approaches toward and recedes from said reflective surface, thereby causing said light beam to be modulated in accordance with said voltages.

4. The improvement of claim 3 further including
   a thin dielectric overcoating disposed between said electrodes and said reflective surface to prevent spurious modulation of said light beam,
   said dielectric overcoating having an index of refraction which is lower than that of the electro-optic element and having a thickness which is appreciably less than said interelectrode gap spacing, thereby preventing said overcoating from materially attenuating said light beam.

5. The improvement of claim 3 wherein
   said electro-optic element is an electro-optic crystal having an optically polished input face through which said light beam enters said crystal and an optically polished output face through which said light beam exits said crystal, and
   said reflective surface is another optically polished face of said crystal which is disposed between said input face and said output face.

6. The improvement of claim 2 wherein
   said electro-optic element is optically transmissive and has a predetermined optical axis,
   said electro-optic device further includes means for transmitting a sheet-like collimated light beam through said electro-optic element,
   said electrodes are spaced apart orthogonally relative to said optical axis and widthwise of said light beam,
   at least every other one of said electrodes is independently addressable,
   said means for applying voltages to said electrodes includes means for applying respective data samples to said independently addressable electrodes during each of several successive cycles, the data samples applied during any one of said cycles representing picture elements for a respective line of an image, and the data samples applied during successive cycles representing picture elements for successive lines of said image, whereby said fringe fields sequentially spatially modulate said light beam in accordance with the picture elements for successive lines of said image.

7. The improvement of claim 6 wherein
   said electro-optic element has a reflective surface which is generally parallel to said optical axis,
   said light beam is applied to said electro-optic element at a grazing angle of incidence relative to said reflective surface to be totally internally reflected therefrom,
   said electrodes are proximity coupled to said electro-optic element adjacent said reflective surface and have projections of substantial length along said optical axis, whereby said light beam interacts with said fringe fields as said light approaches toward and recedes from said reflective surface.

8. The improvement of claim 6 wherein
   said independently addressable electrodes are distributed in alternating paired relationship with additional electrodes, and
   said additional electrodes and data samples are referenced to said predetermined potential.

9. The improvement of claim 8 wherein
   said electro-optic element has a reflective surface which is generally parallel to said optical axis, said light beam is applied to said electro-optic element at a grazing angle of incidence relative to said reflective surface to be totally internally reflected therefrom,
said electrodes are proximity coupled to said electro-optic element adjacent said reflective surface and have projections of substantial length along said optical axis, whereby said light beam interacts with said fringe fields as said light approaches toward and recedes from said reflective surface,
said electro-optic device further includes a thin dielectric overcoating disposed between said electrodes and said reflective surface to prevent spurious modulation of said light beam, and
said dielectric overcoating has an index of refraction which is lower than that of the electro-optic element and a thickness which is appreciably less than said interelectrode gap spacing, thereby preventing said overcoating from materially attenuating said light beam.

10. The improvement of claim 6 wherein
said independently addressable electrodes are the only electrodes for said electro-optic device, and
said data samples are differentially encoded.

11. The improvement of claim 10 wherein
said electro-optic element has a reflective surface which is generally parallel to said optic axis,
said light beam is applied to said electro-optic element at a grazing angle of incidence relative to said reflective surface to be totally internally reflected therefrom,
said electrodes are proximity coupled to said electro-optic element adjacent said reflective surface and have projections of substantial length along said optical axis, whereby said light beam interacts with said fringe fields as it approaches toward and recedes from said reflective surface,
said electro-optic device further includes a thin dielectric overcoating disposed between said electrodes and said reflective surface to prevent spurious modulation of said light beam, and
said dielectric overcoating has an index of refraction which is lower than that of the electro-optic element and a thickness which is appreciably less than said interelectrode gap spacing, thereby preventing said overcoating from materially attenuating said light beam.

* * * * *